US008677101B2

(12) United States Patent
Flachs et al.

(10) Patent No.: US 8,677,101 B2
(45) Date of Patent: Mar. 18, 2014

(54) METHOD AND APPARATUS FOR COOPERATIVE SOFTWARE MULTITASKING IN A PROCESSOR SYSTEM WITH A PARTITIONED REGISTER FILE

(75) Inventors: Brian Flachs, Georgetown, TX (US); Harm Peter Hofstee, Austin, TX (US); Brad William Michael, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1714 days.

(21) Appl. No.: 11/759,636

(22) Filed: Jun. 7, 2007

(65) Prior Publication Data
US 2008/0307201 A1 Dec. 11, 2008

(51) Int. Cl.
*G06F 9/30* (2006.01)
*G06F 9/40* (2006.01)
*G06F 15/00* (2006.01)

(52) U.S. Cl.
USPC .......................................................... 712/218

(58) Field of Classification Search
USPC .......................................................... 712/218
See application file for complete search history.

(56) References Cited

U.S. PATENT DOCUMENTS

| 6,904,511 B2 * | 6/2005 | Hokenek et al. ................ 712/26 |
| 2004/0216100 A1 | 10/2004 | Bower |
| 2005/0065996 A1 | 3/2005 | Lunenfeld |

OTHER PUBLICATIONS

Buyuktosunoglu—Early Stage Definition of LPX: a Low Power Issue Execute Processor—IBM T.J. W. Research Center (Feb. 2002).
Buyuktosunoglu—Energy Efficient Co-Adaptive Instruction Fetch and Issue—IBM T.J.W. Research Center (Nov. 2002).
Intel—Itanium Architecture for Software Developers—Intel (Dec. 28, 2000).
Intel—Tour of the P6 Microarchitecture—Intel (1995).
Sivagnaname—Dual Issue Power PC FXU—UMIPS (Jun. 2001).

* cited by examiner

*Primary Examiner* — Corey S Faherty
(74) *Attorney, Agent, or Firm* — Matt Talpis; Mark P Kahler

(57) ABSTRACT

A processor system executes multiple applet programs within a software application program in an information handling system. The information handling system includes operating system software that manages processor system hardware and software in a multi-tasking environment. In particular, the operating system software manages partitioning of a register file in the processor system to achieve a cooperative relationship among multiple applet programs within respective partitions of the register file. In one embodiment, the operating system software manages unique applet ID's to modify register file partition sizes and locations during applet program instruction text execution. In one embodiment, applet ID masking hardware provides sharing of register file space among multiple copies of applet program code.

15 Claims, 8 Drawing Sheets

FIG. 6A   APPLET ID = a000

FIG. 6B   APPLET ID = bbb,b000

FIG. 6C   APPLET ID = 00c,cc00

FIG. 8

METHOD AND APPARATUS FOR COOPERATIVE SOFTWARE MULTITASKING IN A PROCESSOR SYSTEM WITH A PARTITIONED REGISTER FILE

TECHNICAL FIELD OF THE INVENTION

The disclosures herein relate to information handling systems, and more particularly, to processor systems employing register files to store instruction results from multiple programs or applets.

BACKGROUND

An information handling system (IHS) may include multiple processors for processing, handling, communicating or otherwise manipulating information. Each processor may itself include multiple processor cores that work together to process information. A processor or processor core may include processor functional units such as a stack pointer, a program counter, a fetch and decode unit, an issue and execute unit, register files, and other processor units. The processor units function cooperatively with processor system software to form a processor system. Processor system software may include a high level operating system (OS) or other software that manages the processor functional units within the processor system. Application software typically contains a series of software instructions that run under the operating system software in the processor system. Application software may reside in system memory until the operating system software instructs the processor system to read and execute the application software instructions. Application software may contain an applet program or multiple smaller applet programs that run within the control of the software application software. An applet program is a series of applet instructions or instruction text that runs in a small executable module. The Java programming language is a language that many software professionals commonly associate with applets. (Java is a trademark of Sun Microsystems, Inc.) Applets are small pieces of executable code that need a full software application program to contain or manage them. An applet runs inside of the application in a virtual machine. A virtual machine is a set of processor system resources and instructions that form an environment in which applets may execute. Applets typically must run cooperatively with each other in a multitasking environment. Thus, a software application program may contain multiple applet programs that run together in a cooperatively multitasking fashion. The software application program along with the operating system software and processor hardware must manage applet states to avoid conflicts. For example, applet states include applet hardware register file values, applet program counter data, applet memory data values, and other applet program data.

A multitasking environment, namely multiple program applications and therefore multiple applets running concurrently, requires careful management of the applet states during transition from execution of one applet program to another. Typically, when an applet program deactivates or temporarily suspends operation, OS software saves the applet state information in system memory and local hardware register files. Consequently, the OS software can recover or restore the applet state information from memory at a later time and reactivate the previous applet program for operation within the processor system. Multiple applet programs may run concurrently in this fashion by deactivating and reactivating under OS software control and thus may use the hardware of only one processor system. An applet switch is a mechanism that deactivates one applet program and activates another applet program within the resources of the same processor system. Applet switching consumes system memory and other processor system resources. This resource consumption occurs because the OS software manages applet programs state values and consequently the overhead of the processor system increases. Improper applet state management may cause the processor system to function abnormally and result in processor system software lockups, system memory degradation or other negative processor system state effects.

The operating system software may divide the processor system resources such as system memory, hardware registers and other processor system resources into applet divisions to eliminate any overlap between applets during applet switching in a multitasking environment. It is also possible to divide the register file locations into discrete applet divisions or partitions to support more than one applet set of data values. In this case, the register file applet data values for the applet state do not need to read or write from system memory during each applet switch. However, since register files have a limited number of file locations, duplication of similar or identical applet programs to be able to run concurrently is an inefficient method for managing multiple applets. Applet programs contain a series of applet instruction text or code sequences that define processor operation. A common function or instruction text of an applet program is a read or write to hardware register files within the processor system. Register addresses are typically immediate values, namely real values or address pointers. Since the register addresses are immediate values, the applet instruction text must directly address the register file location.

In the case where multiple applets execute identical instruction text, the management of register file addressing becomes a critical issue. Since deactivating and activating applet programs requires significant overhead in processor system resources, another method to manage identical program applets is needed. One approach to managing identical applet programs without the risk of overwriting register files locations involves partitioning the register file for use by each applet program uniquely. Each identical applet program may have a duplicate copy of itself in memory. Programmers or compiler software rewrites each duplicate copy of the applet to modify the register file addresses to address a unique partition area that the OS software assigns to that specific applet. For example, a processor system that utilizes a register file partition to execute 8 common applets may need 8 copies of the same program instruction text. Moreover, register file addresses must typically be chosen in advance to represent the eight different register file partition areas. This method requires the duplication of applet programs, the re-writing of register files addresses, and ultimately consumes precious memory resources.

What is needed is a method and apparatus that addresses the problems associated with managing multiple applets in a multitasking environment in processor systems as described above.

SUMMARY

Accordingly, in one embodiment, a method is disclosed for cooperative multi-tasking in an information handling system. In one embodiment, the method includes fetching, by a fetch and decode unit, an instruction from one of first and second applets in a memory, thus providing a fetched instruction. The method also includes assigning a first applet ID to the fetched instruction if the fetched instruction is from the first applet and assigning a second applet ID to the fetched instruction if the instruction is from the second applet. The method further includes executing, by an issue and execute unit, the fetched instruction thus providing an instruction result. The method still further includes directing, by a director circuit, the instruction result to a register in a first partition of a register file if the fetched instruction exhibits the first applet ID, and directing the instruction result to a register in a second partition of the register file if the fetched instruction exhibits the second applet ID.

In another embodiment, an information handling system (IHS) is disclosed that includes a memory that stores first and second applets of a software program. The IHS also includes a processor, coupled to the memory. The processor includes a fetch and decode unit that fetches an instruction from one of the first and second applets in the memory, thus providing a fetched instruction. The processor also includes an applet ID storage that assigns a first applet ID to the fetched instruction if the fetched instruction is from the first applet and that assigns a second applet ID to the fetched instruction if the instruction is from the second applet. The processor further includes an issue and execute unit, coupled to the fetch and decode unit, that executes the fetched instruction thus providing an instruction result. The processor still further includes a register file including a first partition that includes a plurality of registers and a second partition that includes a different plurality of registers. The processor also includes a director circuit coupled to the issue and execute unit and the applet ID storage as inputs and to the register file as an output. The director circuit directs an instruction result to a register in the first partition of the register file if the fetched instruction exhibits the first applet ID, and directs the instruction result to a register in the second partition of the register file if the fetched instruction exhibits the second applet ID.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

In a multi-tasking processor system operating with operating system (OS) software, applet programs or applets may communicate with one another under special operating system control. To avoid conflict among the applets, each applet typically must follow a common set of rules while running cooperatively within the same processor system. Since each applet program shares processor system resources, one applet program should not modify the applet state information of another applet program without the consent of the OS software. OS software typically must protect applet state information such as the program counter, stack pointer, register file data, and other state information.

In a cooperative multi-tasking environment, applets are capable of reading and writing across applet states. Applets are typically segments or pieces of the same software application program. In one conventional multi-tasking environment, only one applet executes at any particular point in time, but applet states, such as program counter, register file values, etc. may branch between applets. OS software manages multiple applet states by storing applet state information such as program counter, register file values, and other state information temporarily in memory and swapping in/out to branch between applet programs. One major problem with this approach is the amount of system resources, such as both memory and processor system clock cycles, that the OS software consumes to manage this applet switching.

Rotating register files is another approach to solve the problem of duplicate code and branching overhead when the processor system executes multiple applets. OS software organizes register file addresses into partitions or frames that align with the size requirements of the applet instruction text. In this approach, applet instruction text must include rotate frame commands to point register files addresses to a new location in the register file. This technique does not require the overhead of the extensive memory usage and branching techniques described above. However, software application programs must typically maintain rotate frame commands within the applet program instruction text, thus causing an undesirable increase in applet program size. Moreover, frame rotation does not function effectively in an environment wherein the applet program is too large to allow multiple frame sizes within the existing register file.

Table 1 below shows a single instruction or instruction text from a larger applet program. The single applet instruction (Id r6, 15) is a code sequence that instructs the processor system to "write into register 6 with data value 15". In this example, the applet instruction directs the processor system hardware and operating system to execute a write of the value 15 into register file location 6 within the processor system.

TABLE 1 ld r6, 15

Figure 1A:
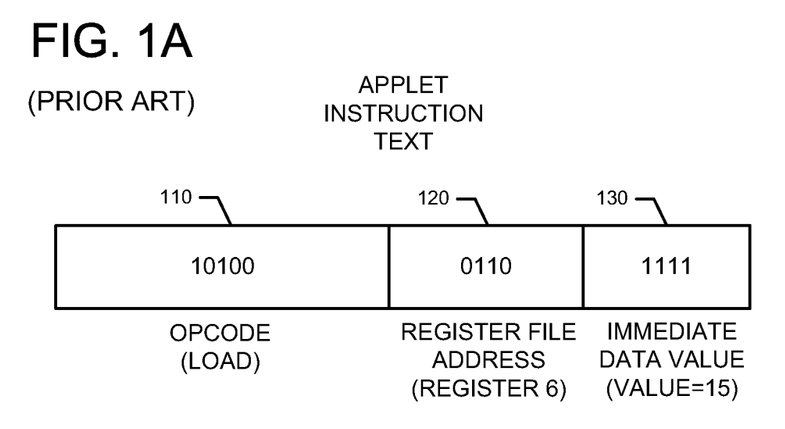
FIG. 1A shows a representation of applet program instruction text.

FIG. 1A depicts a binary representation of the applet instruction text of Table 1. The first of three entries of the instruction text are operation code 110, register file address 120 and immediate data value 130. Operation code (opcode) 110 represents a write register instruction 10100 that defines the primary operation of this particular applet instruction. A register file address value 120 designates the particular register location in the register file into which the processor system will write. In this particular example, a "6" or binary 0110 is the second entry in the instruction text of Table 1. The applet instruction thus writes into register 6 an immediate value, namely a real data value that the third entry 130 indicates. In this case, the final and third entry of the instruction text of Table 1 is a data value 130 of "15" or binary 1111 in FIG. 1A. Thus, binary 1111 is the immediate data value that the processor system writes into the specified register 6 of the register file for this particular applet instruction. The instruction text of Table 1 represents one instruction of a much larger applet instruction sequence. A much larger set of instructions may represent an applet program 0 instruction set or sequence. Executing concurrently in the same multi-tasking processor system may be another applet instruction set namely, applet program 1. Applet program 0 and applet program 1 represent two applets of multiple applets that may run concurrently in a processor system supporting a multi-tasking environment.

One basic approach to understanding register file sharing in a multi-tasking environment is to consider the scenario wherein applet program 0 and applet program 1 are identical applet programs. OS software desires to execute both applet programs 0 and 1 cooperatively within the same processor system resources at the same time. Identical applet programs are common in vector processing such as manipulating graphics images repetitively within a computer image display. Applet program 0 and applet program 1, being identical, share register file address codes such as that depicted in Table 1. If the instruction text of applet program 0 utilizes 8 register file locations during execution, namely register file addresses 0 through 7, applet program 1 must avoid conflict with applet program 1 by not using the same register file locations. One method for allowing both applet program 0 and applet program 1 to run cooperatively is to reassign the register file address value of applet program 1 to a new register file partition area. In other words, one solution is to adjust or modify applet program 1 to reassign all of the register values to a new area of the register file. In this manner, applet program 0 may use registers 0 through 7, while programmers or compiling software modifies the identical applet program 1 to reference a new partition of 8 registers other than registers 0 through 7. For example, compiler software may modify applet program 1 to move or offset each register file address by the value 8. More particularly, each register file address reference of applet program 1 is a copy of the register file address of applet program 0 plus the offset 8. In this manner, applet program 1 will address registers 8 through 15 of the register file. In the example of Table 1 wherein applet program 0 writes to register 6 with a data value, the corresponding instruction text of applet program 1 references register address 6 plus the offset 8, namely register file address 14.

Table 2 below represents the case of two applet instruction text lines of code with a branch instruction in between that a processor system may interpret. The first applet program 0 instruction text (ld r6, 15) instructs the processor system to load or write to register 6 with an immediate data value of 15. Next, a branch command (br, ap 1) instructs the processor system to switch over to applet program 1. The (ld r14, 15) instruction of applet 1 corresponds to the (ld r6, 15) instruction of applet 0. In other words, each of the two applet program load or write instructions is identical with the exception of the register file address value. The corresponding (ld r14, 15) instruction text of applet program 1 instructs the processor system to write into register 14 with an immediate data value of 15.

TABLE 2

| |
|---|
| ld r6, 15 |
| br, ap 1 |
| ld r14, 15 |

Figure 1B:
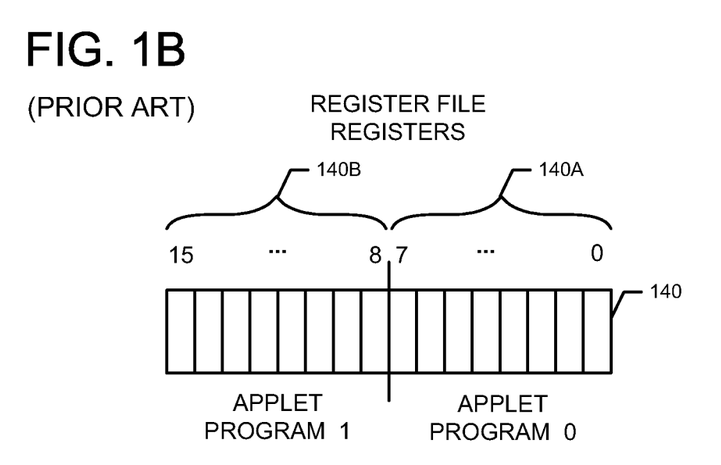
FIG. 1B shows a representation of a partitioned processor system register file.

FIG. 1B is a representation of a register file 140 that includes a set of 16 registers 0-15 that operating system (OS) software groups or partitions into two sets of eight registers each. In this example, the address of each register corresponds to the number of the register. For example, register 0 exhibits an address of 0, register 1 exhibits an address of 1, and so forth up to register 15 that exhibits an address of 15. Applet program 0 utilizes register file address locations 0 through 7 as shown in partition 140A. In order to run an applet program identical to applet program 0, a programmer or software compiler routine modifies the instruction text of applet program 0 to adjust each register file address reference to the new partition 140B. For example, applet program 1 includes instruction text that is a duplicate of the instruction text of applet program 0, except that compiler software increments each register file address reference with an offset value of 8. FIG. 1B shows a register file that exhibits a total register file size of 16 registers. By way of example, for a particular instruction text wherein applet 0 writes to a register 6, the corresponding instruction of applet 1 will write to a register 14, namely 6 plus the offset 8. As seen in FIG. 1B, registers 8 through 15 of register file partition 140B represent the set of registers for use across the entire applet program 1 instruction text set. In this manner, both applet program 0 and applet program 1 may run concurrently without any risk of overwriting the other applet's register file data.

Figure 2:
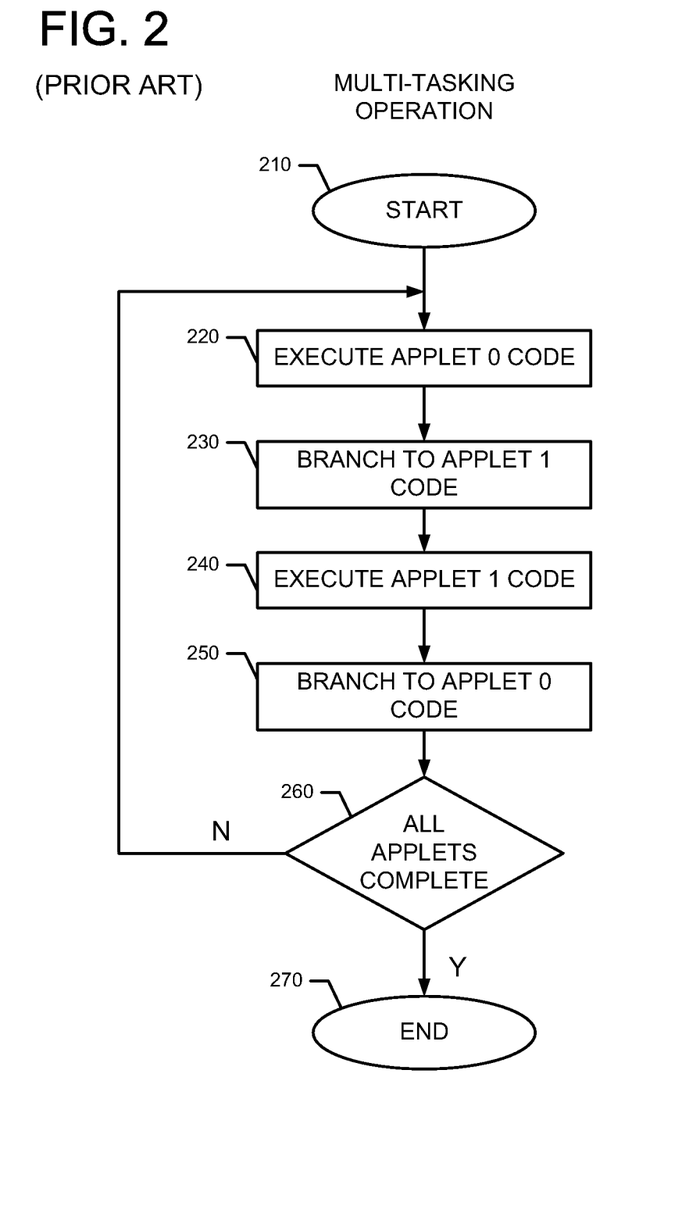
FIG. 2 is a flowchart that depicts a conventional methodology for execution and branching of multiple applet programs

FIG. 2 depicts a flowchart of a processor system running operating system (OS) software that manages multiple applet programs in a conventional manner. For this example, the OS software runs applet program 0 and applet program 1 in a multi-tasking software and hardware environment. The multi-tasking software operation initiates at start block 210. The OS software reads the first line of application program software from processor system memory that contains applet program 0 instruction text. The OS software executes applet program 0 code, as per execute applet 0 code block 220. The OS software then reads or loads the next instruction of the software program application. In this example, this next instruction corresponds to a different applet program, namely applet program 1. In response to encountering this instruction that branches from applet program 0 to applet program 1, the OS software stores the processor system state of applet program 0 and branches to applet program 1 code, as per branch to applet 1 code block 230. The processor system under OS software control then executes applet program 1 code, as per execute applet 1 code block 240.

The above execution and branch to new applet program process is commonly referred to as an "applet switch operation". By restoring the state condition of applet program 0, OS software can then switch back to the code instructions of applet program 0 and continue processing the instruction text therein. OS software branches to applet program 0, as per branch to applet 0 code block 250. The OS software performs a test to determine if all program applets are complete at decision block 260. If the software application program contains more applet program instruction text, the decision block 260 returns a false result, and flow continues back to block 220 wherein applet program code execution continues. If the software application program is complete, namely all applet program code is complete, then the all applets complete decision block 260 returns a true result and the multi-tasking operation of FIG. 2 completes, as per end block 270

The method of FIG. 2 is particularly useful in running any number of multiple applets in a multi-tasking processor system. However, a major drawback to this methodology is that programmers or compiling software typically must duplicate each applet program. Each applet program, regardless of how identical to another applet program, is a duplicate version in entirety with the exception of register file address pointers that may be offset to align with register file partitions. It can be shown that multiple applet programs occupy multiple system memory locations. As FIG. 2 clearly depicts in the example wherein 2 applets execute, system memory must contain 2 copies of the code and branching overhead. Three identical applet programs require 3 copies of the code, 4 applets require 4 copies of the code, and so forth. It is easy to see that as the number of applets increases, the processor system memory and resource requirements grow incrementally and substantially.

Figure 3:
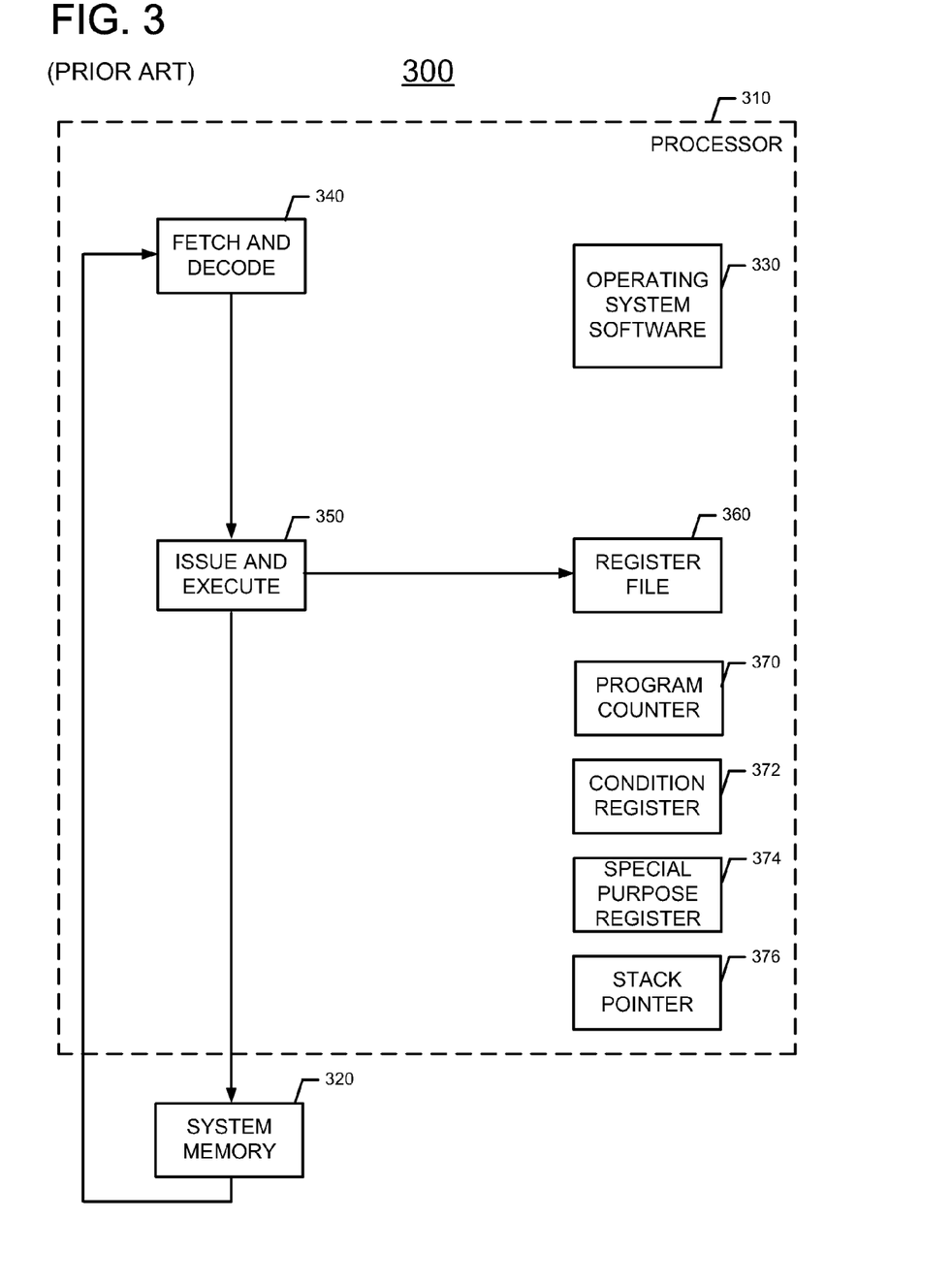
FIG. 3 shows a block diagram of a processor using applet program instruction text.

FIG. 3 is a block diagram of a simplified conventional processor system 300, namely a processor 310 with register file write capability. Applet program software in the form of applet instruction text resides in a system memory 320 that is typically outside of the processor core or processor 310. Processor 300 includes several functional units such as fetch and decode unit 340 and an issue and execute unit 350. System memory 320 couples to fetch and decode unit 340. Fetch and decode unit 340 is responsible for fetching program instructions from system memory 320 and decoding the instruction text for interpretation and use within processor 310. More particularly, the fetch and decode unit 340 receives as input the program instruction data and decodes the instruction data into a series of micro-operations that represent the data flow of the instruction stream therein. Micro-operations or assembly language instructions are the fundamental computer language for use within the processor system.

Operating system (OS) software 330 controls the operation of processor 310 and the functional units therein. Operating system (OS) software 330 initiates fetch and decoding operations by reading applet instruction text from system memory 320 into fetch and decode unit 340. Fetch and decode unit 340 couples to an issue queue within issue and execute unit 350. Issue and execute unit 350 accumulates the instructions that fetch and decode unit 340 provides as micro-operations. Issue and execute unit 350 accumulates multiple applet program software such as applet program 0 instruction text and applet program 1 instruction text. The issue and execute unit 350 couples to a register file 360 and provides the hardware mechanism for applet load or write instructions to present register file address and write data to register file 360. For the opcode example of Table 1 and FIGS. 1A and 1B, issue and execute unit 350 writes a data value of 15 into register 6 of register file 360. This write action of issue and execute unit 350 occurs during the execution of the instruction opcode text therein. Moreover, during issue and execute unit 350 operation, processor 310 utilizes processor units such as a program counter 370, a condition register 372, a special purpose register 374, a stack pointer 376, and other processor units not shown. Issue and execute unit 350 of processor 310 couples to and provides the mechanism to write or store data in system memory 320.

The processor system 300 of FIG. 3 further demonstrates one problem programmers and system designers associate with multi-tasking processor systems. More particularly, applet management problems occur when register file 360 hardware couples directly to the issue and execute unit 350. If multiple applets execute identical code sequences or applet instruction text in a multi-tasking environment, operating system (OS) software 330 typically must segment or divide register file 360 into partitions, namely a discrete equal size area of the register file, for each respective applet. OS software 330 may manage assignments for register file partitions in a per applet program manner. Software programmers or compiling software typically re-write applet instruction text to associate each reference of a register file read or write operation with the proper register file partition. This re-write operation results in the wasteful full duplication of applet instruction text in system memory 320 and the overhead of managing the additional applet instruction text within processor system 300. Larger amounts of applet instruction text not only require more system memory, but also consume larger amounts of processor system 300 resources and operations during fetch, decode, issue and execute operations.

One way to understand conventional register file sharing in a multi-tasking environment is to consider the scenario wherein register file 360 includes 128 registers. One software application program may include 16 identical applets that each use 8 registers. Since 16 applet programs times 8 registers results in the total register file size of 128 registers, 16 is the maximum number of applet programs this processor system may execute for this particular applet.

Figure 4:
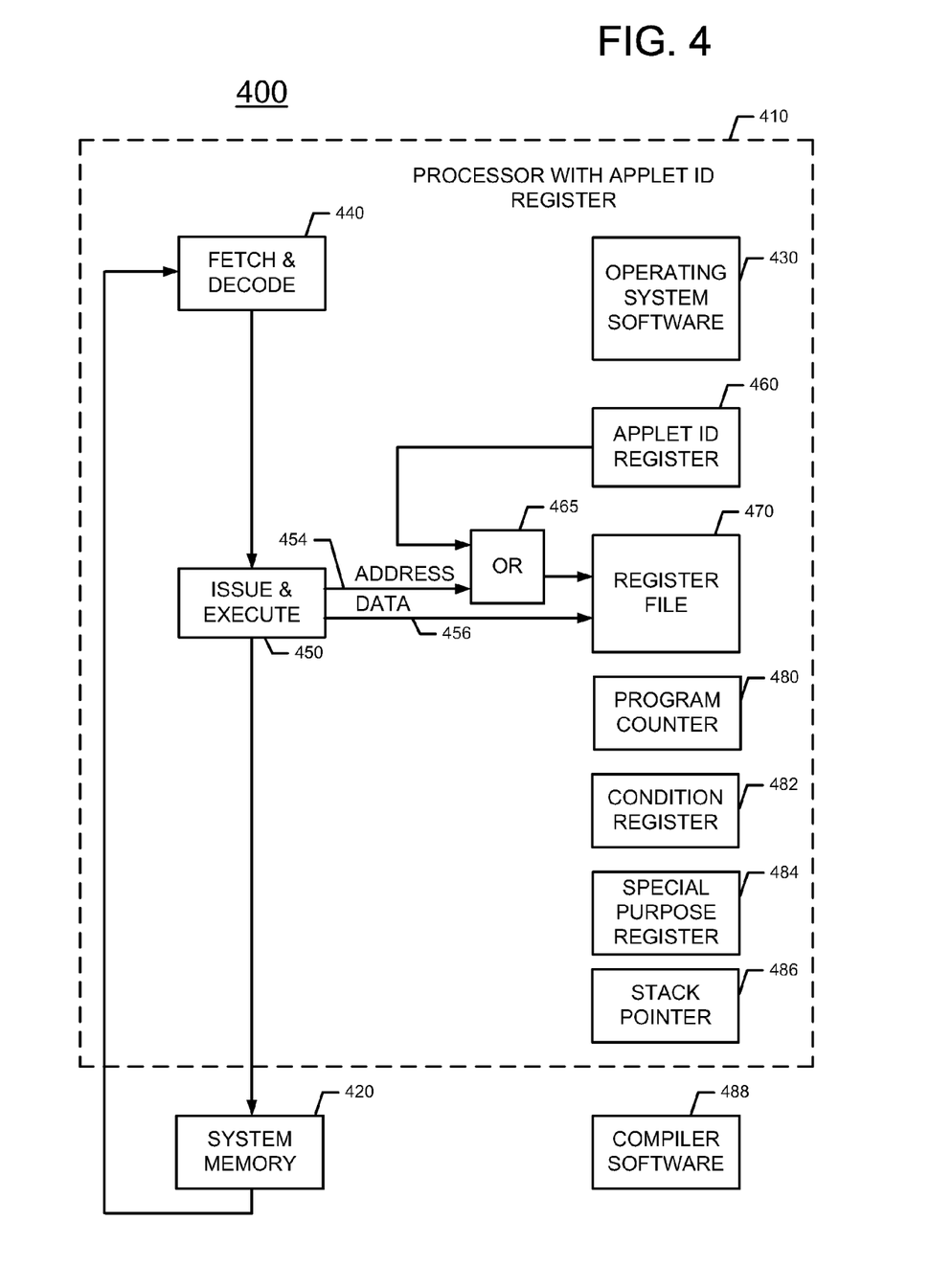
FIG. 4 shows a block diagram of the disclosed processor system with the disclosed register file partitioning methodology.

FIG. 4 shows a block diagram of the disclosed processor system 400 including a processor 410 with applet identifier (ID) register functionality. One or more applet programs within applet program software 415 reside in a system memory 420 in the form of applet instruction text outside of the processor core or processor 410. System memory 420 couples to a fetch and decode unit 440 in processor 410. Fetch and decode unit 440 is responsible for fetching program instructions from applet program 415 in system memory 420 and decoding the instruction text of the applet program for interpretation and use within processor 410. More particularly, the fetch and decode unit 440 receives as input the program instruction data and decodes instruction context data therein into a series of micro-operations. These micro-operations form the data flow of the instruction stream that fetch and decode unit 440 receives from applet program software 415 in system memory 420.

Operating system (OS) software 430 controls the operation of processor 410 and the functional units therein. Operating system (OS) software 430 initiates fetch and decoding operations by reading applet instruction text from system memory 420 to fetch and decode unit 440. Fetch and decode unit 440 couples to an issue and execute unit 450 that includes an issue queue. Issue and execute unit 450 accumulates the instructions that fetch and decode unit 440 provides as micro-operations. Issue and execute unit 450, under the direction of OS software 430, manages multiple applet programs such as applet program 0 instruction text and applet program 1 instruction text. Concurrently with such management, (OS) software 430 initiates the storage of applet ID data into a storage location, namely applet ID register 460. Operating system software 430 maintains a unique applet ID that corresponds to the currently active applet program in use by processor system 400. The output of applet ID register 460 couples to one of the two inputs of an OR unit 465 described in more detail below. In this example, applet ID register 460 couples to input 465A of OR unit 465 to provide the applet ID thereto. OR unit 465 couples between issue and execute unit 450 and register file 470 as shown. Or gate 465 thus provides indirect coupling between issue and execute unit 450 and register file 470.

Applet program instruction text that accesses register file 470 includes register file address and data values. Issue and execute unit 450 couples to the remaining input 465B of OR unit 465 to provide the register address values commonly known as "Thread ID" on address bus 454. Issue and execute unit 450 also couples to an input 470B of register file 470 to provide the register file with data on data bus 456. OR unit 465 generates a binary result of the input "Applet ID" on input 465A and the "Thread ID" on input 465B and presents the resultant at the output of OR unit 465. OR unit 465 couples to register file 470 to provide a register file address thereto. As seen below in Equation 1, the register file address that OR unit 465 provides at its output is the result of OR-ing the Applet ID from applet ID register 460 with the Thread ID or output of the applet program instruction text value from issue and execute unit 450.

Register File Address=Applet ID "OR" Thread ID     EQUATION 1

In one representative embodiment, register file 470 includes 128 discrete addressable file locations, namely 128 registers, each register having a respective address or numerical designation. During issue and execute unit 450 operation, processor 410 utilizes processor functional units such as a program counter 480, a condition register 482, a special purpose register 484, a stack pointer 486, and other processor units not shown. Issue and execute unit 450 of processor 410 couples to, and provides the mechanism to write data to, system memory 420.

In one embodiment of this apparatus and methodology, system memory 420 includes instruction text for applet program 0 and identical instruction text for applet program 1 within applet program software 415. Conventional software application programs may include pointers or references to multiple applets within themselves. For example, a conventional software program application may include instruction text to run an applet and a duplicate copy of that applet concurrently. However, in the disclosed apparatus and methodology, the applet program 1 instruction text does not need an explicit copy of applet program 0 in applet program software 415 of system memory 420. Moreover, OS software 430 uses the same system memory instruction text that the OS software maintains for applet program 0, and uses it again identically for applet program 1. OS software keeps or maintains an applet ID data value in applet ID register 460. Compiler software 488 defines the applet ID data value during compilation of system software to keep track of each individual applet program. In this example, both applet program 0 and applet program 1 require the use of 8 registers of the 128 total registers in register file 470. Thus, operating system software 430 requires the use of 16 registers of the available 128 registers in register file 470 for management of applet program 0 and applet program 1. For this example, the applet program instruction text from applet program software 415 of system memory 420 does not require duplication. The applet ID that OS software 430 associates with each applet program, namely applet program 0 and applet program 1, provides differentiation between the two identical programs. In one embodiment, the applet ID provides the differentiation between the two identical programs, applet 0 and applet 1. If applet program 0 includes opcodes that use registers 0 through 7, namely register file partition 470-0, applet program 1 may still execute by using registers 8 through 15, namely register file partition 470-1, without conflict. Applet ID register 460 and OR unit 465 provide the mechanism to adjust the applet program 1 instruction code, on the fly, to use registers 8-15 instead of the registers 0-7 that identical program 0 employs. Applet program 1 uses registers 8-15 via software and hardware mechanisms that effectively add a data value or offset of 8 to each register address value, in this particular example. More specifically, in one embodiment, OS software 430 modifies each register address value of applet program 1 via the OR masking function of OR unit 465. In this manner, OR unit 465 acts as a director circuit (DIR. CKT.) to send result data on bus 456 either to registers 0-7 (partition 470-0) or registers 8-15 (partition 470-1) depending on the applet ID of the instruction that issue and executing current executes. This instruction result data, or instruction result, is the consequence of issue and execute unit 450 executing the current instruction. The address information that issue and execute unit 450 generates at its address output 454 specifies the target register address in register file 470 where the register file will store the result data unless OR unit 465 modifies that address. As explained above, OR unit 465 may leave the target register address unchanged if the applet ID indicates that the current instruction is from applet 0. In that case, OR circuit 465 provides the instruction result, namely data, to a register in partition 470-0. However, if the applet ID indicates that the current instruction is from applet 1, then OR unit 465 will change the target address to a register address in a range or partition that applet 0 does not use, namely partition 470-1 in this example.

Operating system software 430 maintains an applet ID of 0 in applet ID register 460. More specifically, OS software maintains an applet ID of 0 hexadecimal (hex) or 0000 binary for applet program 0 in applet ID register 460. Operating system software 430 also maintains an applet ID of 8 hex or 1000 binary in applet ID register 460 for applet program 1. As each applet instruction reaches the issue and execute unit 450 in preparation for execution, any read or write instruction to register file 470 places the original register file address known as "thread ID" at input 465B of OR unit 465. Operating system software 430 maintains the output of applet ID register 460 consistent with whatever applet program currently executes in issue and execute unit 450. OS software 430 also utilizes applet ID register 460 to maintain the applet state during applet instruction text execution. The applet ID is an OR pattern or mask that OR unit 465 applies to the thread ID of the applet instruction text to generate the proper register file address at input 470A of register file 470. OR unit 465 applies one mask for applet program 0 and another mask for applet program 1 so that data values at register file input 470B transfer to registers 0-7 for applet program 0 or to registers 8-15 for applet program 1. User mode instructions from OS software 430 write the applet ID into applet ID register 460. During applet switching, OS software 430 stores and retrieves applet ID data in the processor system via special purpose register 484 read and write operations. Alternately, OS software 430 may modify the applet ID in applet ID register 460 by reading branch instruction data from applet program instruction text. The applet program instructions that provide the applet ID augment the program counter 480 data with the applet ID for the current applet instruction text. In one embodiment, register file 470 includes an output 470C that couples to issue and execute unit 450 to provide operands from register file 470 to unit 450.

In one embodiment wherein all register file partitions exhibit equal size, the offset that the applet ID provides equals the number of registers of a partition. For example, if applet 0 requires 4 registers and the size of the applet 0 partition is 4 registers, then the offset that the processor uses for the applet 1 partition is 4. If applet 0 requires 8 registers and the size of the applet 0 partition is 8 registers, then the offset that the processor uses for the applet 1 partition is 8.

Figure 5A:
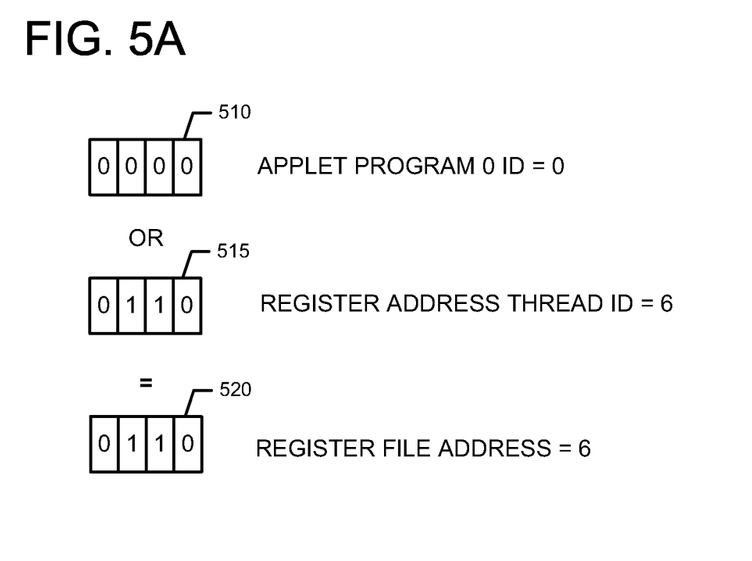
FIG. 5A shows the binary representation of the inputs and outputs of a director circuit that the disclosed processor system employs.

FIG. 5A depicts the values in the functional units of processor system 400 that contain applet ID information or data, namely issue and execute unit 450, applet ID register 460, and OR unit 465. FIG. 5A shows representative data states for the example of FIG. 4 using the simple applet instruction text of Table 1 as an example. When issue and execute unit 450 executes applet program 0, operating software 430 maintains an applet program 0 ID 510 (applet ID) that exhibits a value of 0 hex or 0000 binary at the output of applet ID register 460. Using the single applet instruction test opcode and operands of Table 1, namely "Id r6, 15", issue and execute unit 450 presents a register address thread ID 515 (thread ID) value of 6 hex or 0110 binary on address bus 454 to input 465B of OR unit 465. Register address thread ID 515 represents the actual applet program instruction text register address that the applet program 0 instruction text code designates for writing or other operation. OR unit 465 calculates or determines the Boolean OR function of two input values, namely 0 hex and 6 hex, to provide a result of 6 hex at the output of the OR unit. The output of OR unit 465 is the true or real register file address 520, namely the value of 6 hex in this case, that drives the address input 470A of register file 470. Issue and execute unit 450 presents a data value of 15 on data bus 456 which then writes into register file location 6 hex and the applet program 0 instruction code completes with the write operation to register file 470. Thus, in the case of applet program 0, the applet ID (OR mask) that applet ID register 460 provides to input 465A of OR unit 465, does not alter or offset the address thread ID that OR unit 465 provides to the address input 470A of register file 470.

Figure 5B:
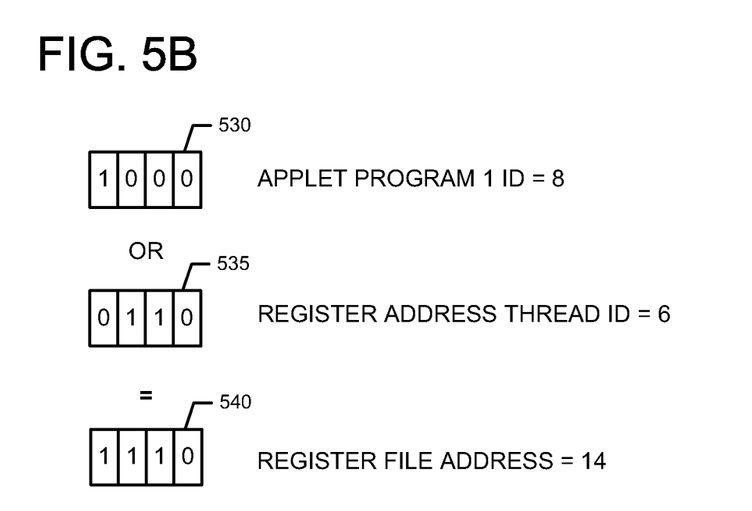
FIG. 5B shows another example of a binary representation of the inputs and outputs of a director circuit that the disclosed processor system employs.

FIG. 5B depicts the values in the same functional units of processor system 400 that FIG. 5A depicts, except that FIG. 5B shows the values for applet program 1. The next instruction in the issue and execute unit 450 is the same instruction code in the FIG. 5A example above, namely "Id r6, 15" again from the example of Table 1. However, operating system software 430 interprets this instruction as part of applet program 1. Since the instruction text from applet program 0 and applet program 1 are identical in construct, it is up to the unique applet ID register 460 and OR unit 465 to differentiate between the two applet programs of this example. Because applet program 1 is under execution by issue and execute unit 450, operating system software 430 maintains an applet program 1 ID 530 (applet ID) that exhibits a value of 8 hex or 1000 binary as the output of applet ID register 460. Using again the single applet instruction test opcode and operands of Table 1, issue and execute unit 450 presents a register address thread ID 535 value (thread ID) that exhibits a value of 6 hex or 0110 binary on address bus 454 to input 465B of OR unit 465. OR unit 465 calculates or determines the Boolean OR function of two input values, namely 8 hex and 6 hex, to provide a result of E hex or 14 decimal base 10 (dec). The output of OR unit 465 is the true or real register file address 540, namely a value of E hex in this case, that drives the address input 470A of register file 470. Issue and execute unit 450 presents a data value of 15 on data bus 456 which then writes into register file location E hex or 14 dec. The applet program 1 instruction code then completes with the write operation to register file 470. Thus, rather than writing a 15 to register address 6 (i.e. register 6) as for applet program 0, in the case of applet program 1 register file 470 will write the value 15 into register address 14 (i.e. 8+6). OR unit 465 thus applies an address offset, namely the applet ID=8, which equals the number of unique registers that applet 0 requires. This address offset assures that applet 0 and applet 1 do not write to the same registers in register file 470.

Applet program 0 register file addresses ranging from 0 through 7 translate through OR unit 465 into applet program 1 register file addresses ranging from 8 through 15. Thus, applet program 0 and 1 do not overlap in any register file 470 locations. This ability to manage identical applet programs without the need for duplicating the entire applet program in memory provides a more efficient multi-tasking processor system environment for the end user. Utilizing the OR masking function of OR unit 465 provides the software application programmer with the flexibility of running a large number of identical applet programs without the risk of running out of register file 470 address locations, namely registers. Operating system software may also manage many different applet register file size programs within the limits of the total register file 470 size. For this example of FIG. 4-5, register file 470 includes a total of 128 register file address locations. In actual practice, register file 470 may include a larger number or smaller number of register file address locations or registers depending on the particular application.

FIG. 4 and FIG. 5 represent an example of partitioning the register file into two register files partitions that each include 8 registers or register file address locations. The register file 470 address includes 4 bits that allow for a total of 16 registers. By increasing the total register address field to 7 bits, operating system software 430 may address the entire register file 470 size of 128 address locations.

Figure 6A:
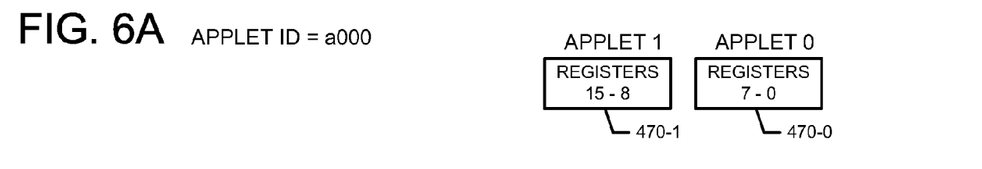
FIG. 6A is a block diagram depicting register file partitioning in the disclosed processor system and methodology.

FIG. 6A depicts the register file addressing scheme of FIG. 4, FIG. 5A and FIG. 5B. Operating system software 430 assigns register file partitions corresponding to the total number of registers that each applet program needs. Applet program 0 requires 8 registers. Because applet program 1 is an identical copy of applet program 0, OS software 430 partitions the same register file 470 to reserve another 8 unique registers for applet program 1. The applet ID shown as a000 depicts a binary set wherein "a" represents a binary bit that increments for each applet program. For example, for applet program 0, OS software maintains an applet ID value of 0000, wherein a=0, in applet ID register 460. The applet ID remains active during issue and execution of any applet program 0 instruction text. When the applet program 0 instruction text issues a read or write to register file 470, issue and fetch unit 440 places the thread ID value, namely the target address of the current instruction text, on address bus 454. For the example code of Table 1, this representative address thread ID value is a 6 hex value that specifies register 6. OR unit 465 OR's the applet ID value of 0 hex with the thread ID value of 6 hex which yields the resultant register file address of 6 hex, i.e. no address offset. The resultant address 6 hex falls within the first of two partition register file areas of registers 0 through 7 for applet 0. More specifically, resultant address 6 hex is within partition 470-0 of FIG. 6A. FIG. 6A also shows a second partition 470-1 of equal size to partition 470-0. Partition 470-0 includes registers 0-7 for use by applet 0 and partition 470-1 includes registers 8-15 for use by applet 1.

When instruction text for applet program 1 reaches issue and fetch unit 450, a thread ID for the same example of Table 1 also presents a thread ID value of 6 hex as input to input 465B of OR unit 465. OS software maintains an applet ID value of 1000 binary wherein "a"=1 to access the second of two partitions in register file 470. Applet ID register 460 applies the applet ID value of 1000 binary wherein a=1 to the remaining input 465A of OR unit 465. In binary, 1000 corresponds to 8 hex. Thus, the OR mask operation that OR unit 465 provides effectively adds an offset of 8 hex to the thread ID value of 6 hex. This causes the current instruction of applet program 1 to write to register 14 hex, namely the sum of 6 hex plus the offset 8 hex.

Figure 6B:
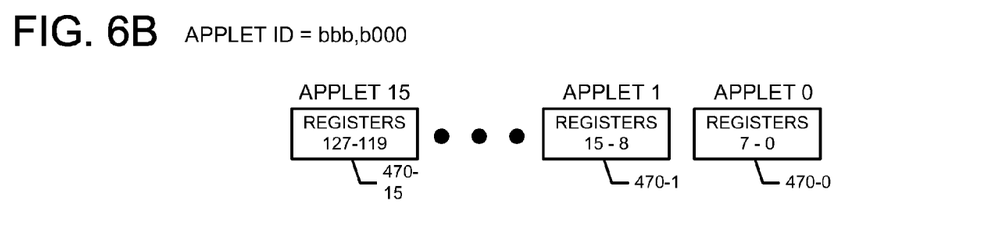
FIG. 6B is a block diagram of another example of register file partitioning in the disclosed processor system and methodology.

FIG. 6B depicts another example of register file partitioning by use of applet ID data or information. OS software maintains an applet ID value of the binary string bbb,b000. More specifically, the term "b" represents a binary field that can be either a "0" or "1" value. The 4 "b" bits, that represent the portion of the register address that applet ID data values can affect, correspond to 16 unique addresses within the total of 128 registers of register file 470. The total partitioning effect of the entire address field shown as bbb,b000 corresponds to 16 register partitions of 8 registers each. Each register exhibits a different register address. OS software 410 may use this particular method of partitioning to provide for 16 identical applet programs using 8 registers each. For example, applet program 0 uses register files 0 through 7 in partition 470-0, applet program 1 uses registers 8 through 15 in partition 470-1, and so on, up to applet program 15 that uses registers 28-31 in partition 470-15. As FIG. 6B indicates, each partition corresponds to 8 register files. The complete address for each can be seen as "000,0000" binary through "000,0111" binary for applet program 1, "000,1000" through "000,1111" for applet program 1 and so on until finally a register file address of "111,1000" through "111,1111" represents the final partition shown as 119 through 127 for applet program 15.

The examples of FIG. 6A and FIG. 6B represent applet program software in a cooperative multi-tasking environment. Both examples reflect a partitioning of a register file for applet programs that operating system software assigns to respective partitions of identical size in terms of the number of registers in each register file partition. This mechanism and methodology of register file partitioning protects against the condition of applet program interference where different applet programs attempt to access the same registers in the register file. More specifically, this methodology restricts the ability of one applet program to read or write any register that the OS software associates with another applet program by way of applet ID representation. Although this partitioning methodology is effective, in some applications it may be useful to allow some cross sharing of register file address locations under the careful control of operating system software 430. By including "1" bits in the applet ID value that correspond to the same position as "1" bits in the thread ID, it is possible for both register sharing and fixed partition space to coexist in register file 470.

Figure 6C:
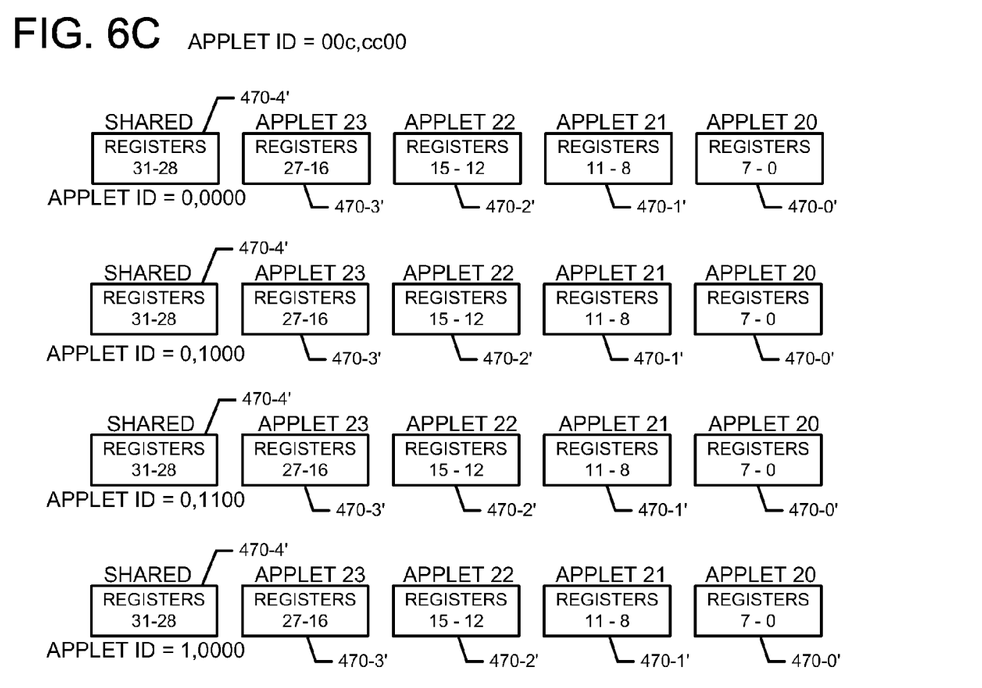
FIG. 6C a block diagram of another yet example of register file partitioning in the disclosed processor system and methodology, namely one that employs fixed and shared register file partitioning.

FIG. 6C shows just such an example of register sharing and fixing partition space within the register file addresses of register file 470. For this example, operating system software 430 manages and partitions the lower 32 address file locations of register file 470, namely registers 0-31. Four applets, namely applet program 20, applet program 21, applet program 22, and applet program 23 represent the complete set of applet programs running within one software application program in processor system 400. OS software maintains an applet ID in applet ID 460 register of 00c,cc00 binary. In other words, each binary element that the term "c" depicts is within the range of address bits that OS software 430 may represent as a binary "0" or "1" bit. FIG. 6C also represents the 4 addressing schemes and register file assignments for the 4 applet programs, namely applet program 20—applet program 23 in this embodiment.

Table 3 below shows each of 32 register file locations that the example of FIG. 6C further depicts. In this example, register file 470 divides into 5 partitions, namely a partition 470-0' that includes registers 0-7, a partition 470-1' that includes registers 8-11, a partition 470-2' that includes registers 12-15, a partition 470-3' that includes registers 16-27 and a partition 470-4' that includes registers 28-31. Partitions 470-0', partition 470-1', partition 470-2' and partition 470-3' are unshared partitions because applet 20 uses the registers of partition 470-0' without sharing those registers with other applets. Likewise, applet 21 uses the registers of partition 470-1' without sharing those registers with other applets. Applet 22 uses the registers of partition 470-2' without sharing those registers with the other applets, and applet 23 uses the registers of partition 470-3' without sharing those registers with the other applets. However, applets may share shared partition 470-4' under control and management of such sharing by the operating system. In the case of shared partition 470-4', the operating system manages the shared registers of this partition to prevent conflict problems among the applets that share the registers of this shared partition.

TABLE 3

| REGISTER | APPLET ID (offset) | THREAD ID (address) | APPLET PROGRAM |
|---|---|---|---|
| 0 | 0,0000 | 0,0000 | 20 |
| 1 | 0,0000 | 0,0001 | 20 |
| 2 | 0,0000 | 0,0010 | 20 |
| 3 | 0,0000 | 0,0011 | 20 |
| 4 | 0,0000 | 0,0100 | 20 |
| 5 | 0,0000 | 0,0101 | 20 |
| 6 | 0,0000 | 0,0110 | 20 |
| 7 | 0,0000 | 0,0111 | 20 |
| 8 | 0,1000 | 0,0000 | 21 |
| 9 | 0,1000 | 0,0001 | 21 |
| 10 | 0,1000 | 0,0010 | 21 |
| 11 | 0,1000 | 0,0011 | 21 |
| 12 | 0,1100 | 0,0000 | 22 |
| 13 | 0,1100 | 0,0001 | 22 |
| 14 | 0,1100 | 0,0010 | 22 |
| 15 | 0,1100 | 0,0011 | 22 |
| 16 | 1,0000 | 0,0000 | 23 |
| 17 | 1,0000 | 0,0001 | 23 |
| 18 | 1,0000 | 0,0010 | 23 |
| 19 | 1,0000 | 0,0011 | 23 |
| 20 | 1,0000 | 0,0100 | 23 |
| 21 | 1,0000 | 0,0101 | 23 |
| 22 | 1,0000 | 0,0110 | 23 |
| 23 | 1,0000 | 0,0111 | 23 |
| 24 | 1,0000 | 0,1000 | 23 |
| 25 | 1,0000 | 0,1001 | 23 |
| 26 | 1,0000 | 0,1010 | 23 |
| 27 | 1,0000 | 0,1011 | 23 |
| 28 | 1,1100 | 0,0000 | 20–23 |
| 29 | 1,1100 | 0,0001 | 20–23 |
| 30 | 1,1100 | 0,0010 | 20–23 |
| 31 | 1,1100 | 0,0011 | 20–23 |

Operating system software 430 maintains an applet ID of 0,0000 binary in applet ID register 460 for use during the execution of one of four applet programs, namely applet program 20 in processor system 400. FIG. 6C demonstrates the OS software creating and maintaining a partition 470-0' of 8 register file locations 0 through 7 for use by applet program 20. As seen in more detail in Table 3, applet program 20 produces thread ID values of 0,0000 through 0,0111, that correspond to the 8 register file locations in partition 470-0'. OS software and processor system hardware generate actual register file addresses by using OR unit 465 and providing for the input of applet ID 0,0000 and thread ID 0,0000 through 0,0111 to OR unit 465. Or unit 465 applies the Boolean OR function to one OR input value, namely applet ID 0,0000, while the other OR input value, namely thread ID, varies from 0,0000 through 0,0111, register files locations 0 through 7 become available for use by applet program 20. In contrast, referring to Table 3, if the applet ID data value is 1,1100 binary, then applet program 20 may address register file locations 28 through 31. In this particular embodiment, the OS software provides sharing of register file locations 28 through 31 with all other applet programs of the software application program running multiple applet programs in processor system 400.

FIG. 6C and Table 3 show the second of four applet programs, namely applet program 21. Operating system software 430 maintains an applet ID of 0,1000 binary in applet ID register 460 for use during the execution of applet program 21 in processor system 400. FIG. 6C shows OS software creating and maintaining a partition 470-1' that includes 4 register file locations or registers 8 through 11 for use by applet program 21. As seen in more detail in Table 3, applet program 21 produces thread ID values of 0,0000 through 0,0011, that respectively correspond to the 4 register file locations 8 through 11. OS software and processor system hardware generate actual register file addresses by applying the applet ID OR input value of 0,1000 while the other OR input value varies from thread ID 0,0000 through 0,0011. Register file locations or registers 8 through 11 are thus available for addressing by applet program 21. Moreover, if the applet ID data value becomes 1,1100 binary, then applet program 21 may address shared register file locations 28 through 31. OS software provides sharing of register file locations 28 through 31 with all other applet programs of the software application program running multiple applet programs in processor system 400.

FIG. 6C and Table 3 also show the third of four applet programs, namely applet program 22. Operating system software 430 maintains an applet ID of 0,1100 binary in applet ID register 460 for use during the execution of applet program 22 in processor system 400. FIG. 6C shows OS software creating and maintaining a partition 470-2' that includes 4 register file locations or registers 12 through 15 for use by applet program 22. As seen in more detail in Table 3, applet program 22 produces thread ID values of 0,0000 through 0,0011 that respectively correspond to the 4 register file locations 12-15. OS software and processor system hardware generate actual register file addresses by applying the applet ID OR input value of 0,1100 while the other OR input value varies from thread ID 0,0000 through 0,0011. Register files locations or registers 12 through 15 are thus available for addressing by applet program 22. Moreover, if the applet ID data value becomes 1,1100 binary, then applet program 22 may address shared register file locations 28 through 31. OS software provides sharing of register file locations 28 through 31 with all other applet programs of the software application program running multiple applet programs in processor system 400.

FIG. 6C and Table 3 further show the fourth of four applet programs, namely applet program 23. Operating system software 430 maintains an applet ID of 1,0000 binary in applet ID register 460 for use during the execution of applet program 23 in processor system 400. FIG. 6C shows OS software creating and maintaining a partition 470-3' that includes 12 register file locations or registers 16 through 27 for use by applet program 23. As seen in more detail in Table 3, applet program 23 produces thread ID values of 0,0000 through 0,1011 that respectively correspond to the 12 register file locations 16-27. OS software and processor system hardware generate actual register file addresses by applying the applet ID OR input value of 1,0000 while the other OR input value varies from thread ID 0,0000 through 0,1011. Register files locations or registers 16 through 27 are thus available for addressing by applet program 23. Moreover, if the applet ID data value becomes 1,1100 binary, then applet program 23 may address shared register file locations 28 through 31. OS software provides sharing of register file locations 28 through 31 with all other applet programs of the software application program running multiple applet programs in processor system 400.

The example of FIG. 6C demonstrates a shared partition 470-4' that OS software 430 generates to enable sharing register file locations among applet programs. The OS software uses the disclosed partitioning scheme to provide partitions specific to and dedicated to the respective applet programs. Applet program partition sizes include 4 registers, 8 registers, and a larger 12 register partition. These partition sizes are for example purposes. In actual practice, partition size may be smaller or larger than the examples given depending on the particular application. Register file size may also vary depending on the particular application. Such a mixture of partition sizes with multiple applet programs represents a flexible cooperative multi-tasking environment within processor system 400. Moreover, applet programs may address register file locations without explicitly naming the address of the real register file 470 location. Many different partition sizes, partition separation and partition sharing schemes are possible with the teachings herein.

Figure 7:
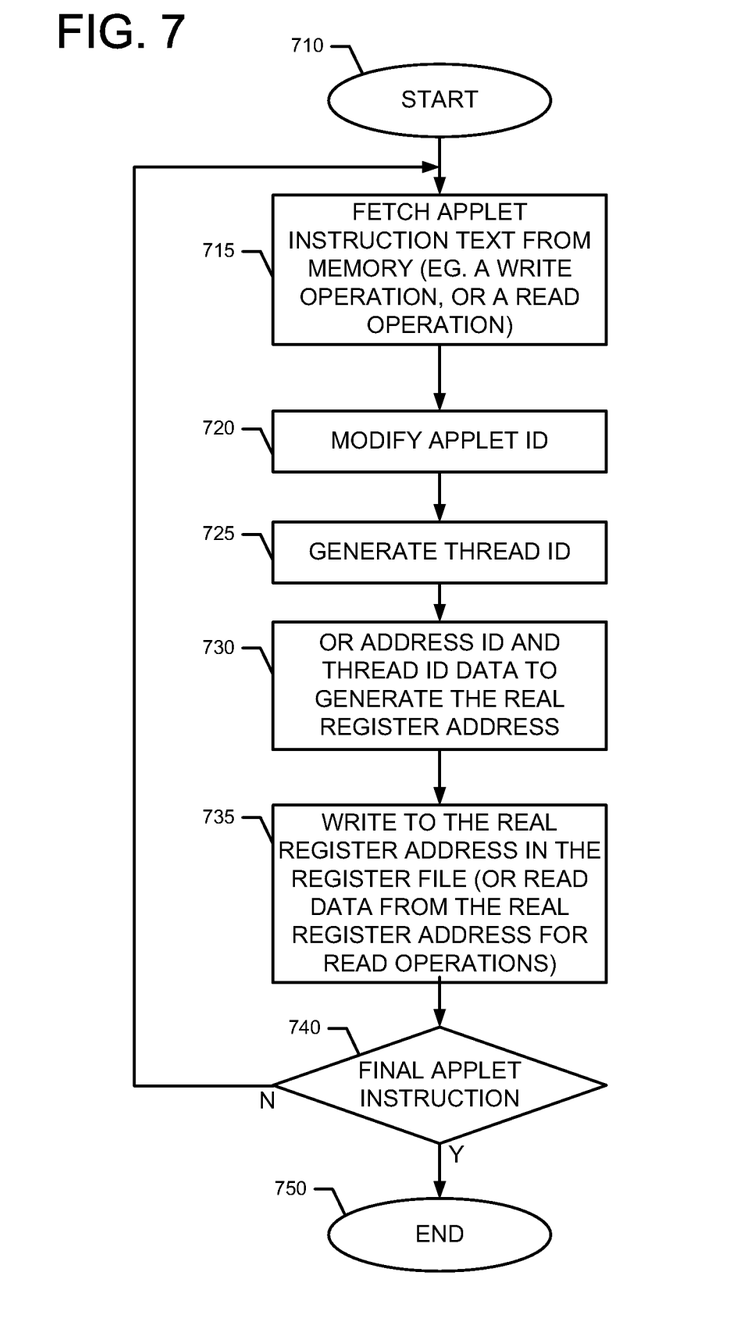
FIG. 7 is a flow chart that depicts one embodiment of the disclosed register file partitioning and applet ID management methodology.

The FIG. 7 is a flowchart that shows one embodiment of the cooperative applet register file management methodology. More specifically, FIG. 7 represents a register file write operation from applet program instruction text. One or more applet programs within applet program software 415 reside in system memory 420 and execute under the control of operating system software 430 in conjunction with processor system 400 hardware. Flow begins at start block 710. The operating system software cooperates with fetch and decode unit 440 of processor system 400 to fetch applet instruction text from system memory 420, as per block 715. The OS software reads applet ID data from special purpose register 484 and modifies the applet ID register 460 with the applet ID that associates with the current applet instruction text, as per modify applet ID block 720. Issue and execute unit 450 generates the thread ID from the current applet program instruction text and places the thread ID on address bus 454, as per block 725. The applet ID from applet ID register 460 and the thread ID data from issue and execute unit 450 provide the two input values to OR unit 465. In response, OR gate unit 465 logically OR's these two input values to generate a real register file address or register number, as per block 730. Issue and execute unit 450 provides instruction text data on data bus 456 in the case of a write to register file operation. The operating system writes applet instruction text data to the particular real register file address location that the OR operation specifies, as per write register file block 735. If final applet instruction test block 740 determines that the current applet instruction is not the final instruction of the applet, then flow returns to block 715. When flow returns to block 715 in this manner, the OS software cooperates with fetch and decode unit 440 to fetch the next applet program instruction text from system memory 420 and flow continues. However, if the applet program is complete, test block 740 returns a true result and process flow ends, as per end block 750. While the particular examples above refer to write or load operations into register file locations, the teachings herein apply as well to read operations from register file locations. In that case, read operations substitute for the write operations taught herein. Rather than writing to the register file address that OR unit 465 specifies, processor system 400 reads from the register file address that OR unit 465 specifies. When using the partitioning apparatus and methodology, the processor does not require multiple copies of identical applets.

Figure 8:
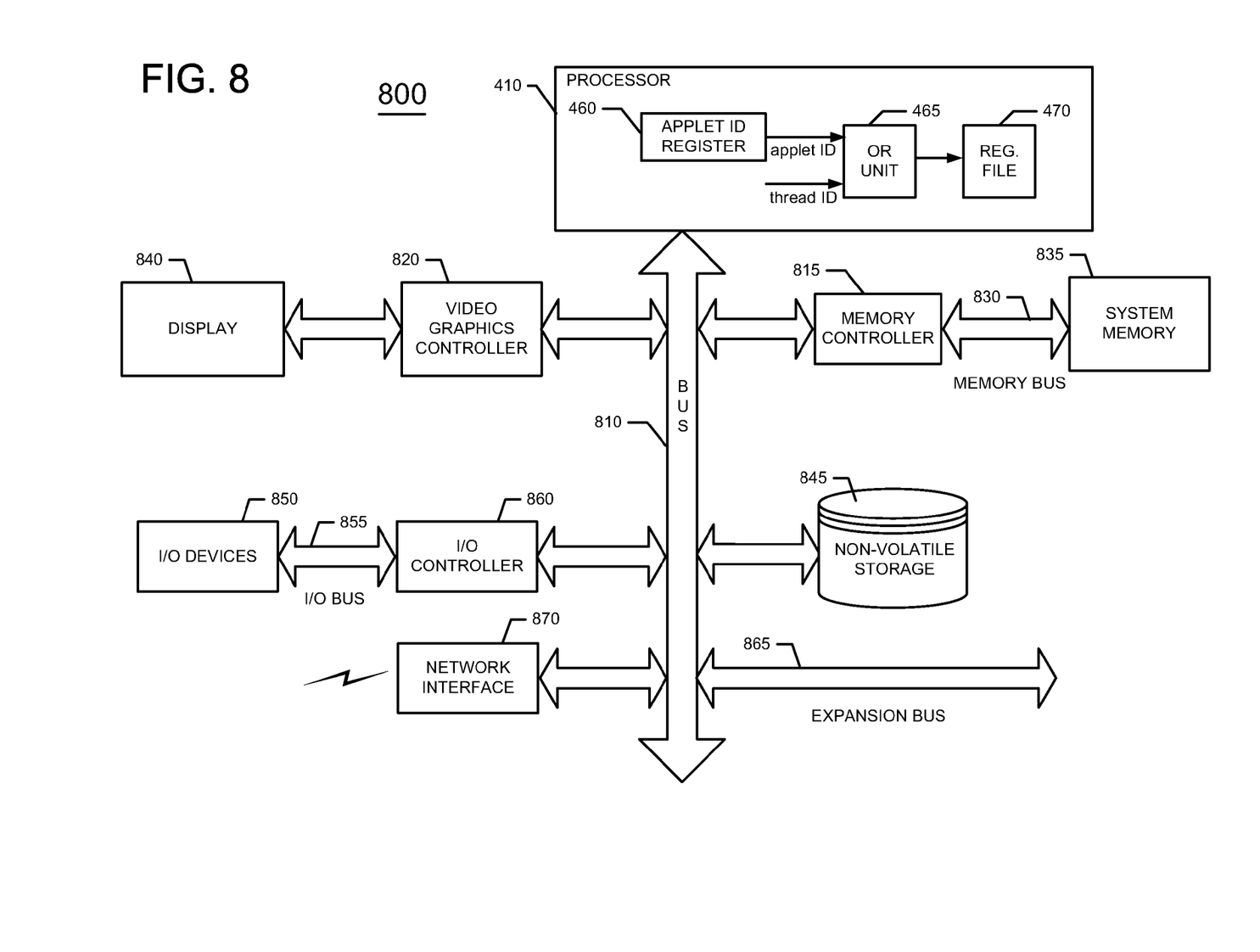
FIG. 8 is a block diagram of an information handling system that employs the disclosed register file partitioning and applet ID management methodology.

FIG. 8 shows a simplified block diagram of a representative information handling system (IHS) 800 that employs processor 410. In one embodiment, processor 410 includes applet ID register 460 that couples to OR unit 465. Register file 470 couples to OR unit 465. While due to drawing space limitations, FIG. 8 does not reproduce all components of processor 410 shown in FIG. 4, processor 410 of FIG. 8 includes those processor components shown in FIG. 4. IHS 800 further includes a bus 810 that couples processor 410 to memory controller 815 and video graphics controller 820. More particularly, system memory bus 830 couples to system memory 835 as shown. In actual practice, bus 810 may include multiple buses, for example a memory bus and an I/O bus. A display 840 couples to video graphics controller 820. Nonvolatile storage 845, such as a hard disk drive, CD drive, DVD drive, or other nonvolatile storage couples to bus 810 to provide IHS 800 with permanent storage of information. I/O devices 850, such as a keyboard and a mouse pointing device, couple via I/O bus 855 and I/O controller 860 to bus 810. One or more expansion busses 865, such as USB, IEEE 1394 bus, ATA, SATA, PCI, PCIE and other busses, couple to bus 810 to facilitate the connection of peripherals and devices to IHS 800. A network interface adapter 870 couples to bus 810 to enable IHS 800 to connect by wire or wirelessly to a network and other information handling systems. While FIG. 8 shows one IHS that employs applet program management processor 410, the IHS may take many forms. For example, IHS 800 may take the form of a desktop, server, portable, laptop, notebook, or other form factor computer or data processing system. IHS 800 may take other form factors such as a gaming device, a personal digital assistant (PDA), a portable telephone device, a communication device or other devices that include a processor and memory.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of cooperative multi-tasking in an information handling system, the method comprising:
    assigning, by a compiler, a first applet ID to a first identical applet and a second applet ID to a second identical applet, wherein the first and second identical applets exhibit identical instruction text;
    storing, one of the first and second identical applets in a system memory without storing the other of the first and second identical applets in the system memory, thus providing a stored applet that reduces system memory requirements;
    fetching, by a fetch and decode unit, an instruction from the stored applet in system memory, thus providing a fetched instruction;
    executing, by an issue and execute unit, the fetched instruction thus providing an instruction result; and
    directing, by a director circuit, the instruction result to a register in a first partition of a register file if the fetched instruction exhibits the first applet ID, and directing the instruction result to a register in a second partition of the register file if the fetched instruction exhibits the second applet ID.

2. The method of claim 1, wherein the director circuit performs a logical OR operation to determine a register file address location that indicates whether the instruction result is directed to the first or second partition of the register file.

3. The method of claim 2, wherein the logical OR operation includes logically OR'ing an applet ID and a register file register address that the instruction result specifies, the applet ID indicating whether the fetched instruction is from the first identical applet or the second identical applet.

4. The method of claim 1, wherein the registers in the second partition exhibit offset addresses with respect to registers in the first partition.

5. The method of claim 1, wherein the assigning step comprises storing an applet ID in a storage location in response to the issue and execute unit executing the fetched instruction.

6. The method of claim 5, wherein the applet ID is the first applet ID if the fetched instruction is from the first identical applet, and the applet ID is the second applet ID if the fetched instruction is from the second identical applet.

7. An information handling system (IHS), comprising:
    a system memory that stores one of first and second identical applets of a software program without storing the other of the first and second identical applets in the system memory, thus providing a stored applet that reduces system memory requirements, a first applet ID being assigned to the first identical applet and a second applet ID being assigned to the second identical applet, wherein the first and second identical applets exhibit identical instruction text;
    a processor, coupled to the memory, the processor including:
        a fetch and decode unit that fetches an instruction from the system memory, thus providing a fetched instruction;
        applet ID storage that stores the first applet ID if the fetched instruction is from the first identical applet and that stores the second applet ID if the instruction is from the second identical applet;
        an issue and execute unit, coupled to the fetch and decode unit, that executes the fetched instruction thus providing an instruction result;
        a register file including a first partition that includes a plurality of registers and a second partition that includes a different plurality of registers;
        a director circuit, coupled to the issue and execute unit and the applet ID storage as inputs and to the register file as an output, that directs an instruction result to a register in the first partition of the register file if the fetched instruction exhibits the first applet ID, and that directs the instruction result to a register in the second partition of the register file if the fetched instruction exhibits the second applet ID.

8. The IHS of claim 7, wherein the instruction result includes a register file address in the register file.

9. The IHS of claim 7, further comprising an operating system that controls the applet ID storage.

10. The IHS of claim 7, wherein the applet ID storage comprises an applet ID register.

11. The IHS of claim 7, wherein the director circuit comprises a logic OR circuit, the logic OR circuit performing a logic OR operation to determine whether the instruction result is directed to the first or second partition of the register file.

12. The IHS of claim 11, wherein the instruction result includes a register file address, and further wherein the logic OR circuit performs a logic OR operation on the applet ID of an instruction with the register file address of that instruction's instruction result.

13. The IHS of claim 7, wherein the registers in the second partition exhibit offset addresses with respect to registers in the first partition.

14. The IHS of claim 7, wherein the fetched instruction requests a write operation to a register address in the register file.

15. The IHS of claim 7, wherein the fetched instruction requests a read operation from a register address in the register file.

* * * * *